US012798316B2

(12) United States Patent
Suzuki et al.

(10) Patent No.: US 12,798,316 B2
(45) Date of Patent: Nov. 17, 2026

(54) WORK VEHICLE

(71) Applicant: Kubota Corporation, Osaka (JP)

(72) Inventors: Hiroyuki Suzuki, Sakai (JP); Akira Tominaga, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/812,017

(22) Filed: Aug. 22, 2024

(65) Prior Publication Data

US 2025/0065680 A1 Feb. 27, 2025

(30) Foreign Application Priority Data

Aug. 23, 2023 (JP) ................................ 2023-135495

(51) Int. Cl.
*B60G 7/02* (2006.01)

(52) U.S. Cl.
CPC .......... *B60G 7/02* (2013.01); *B60G 2204/143* (2013.01)

(58) Field of Classification Search
CPC .... B60G 7/02; B60G 2204/143; B60G 7/008; B60G 2204/41; B60G 2204/4302; B60G 2204/4402
See application file for complete search history.

(56) References Cited

U.S. PATENT DOCUMENTS 4,541,641 A * 9/1985 Kubo .................. F16J 15/3232 277/402
6,817,599 B2 * 11/2004 Kato .................... F16F 1/3835 267/140
7,063,342 B2 * 6/2006 Seki ......................... B60G 7/02 384/488
7,914,021 B2 * 3/2011 Whitacre ................. B60G 7/02 280/86.756
8,585,068 B2 * 11/2013 Schlangen ............... B60G 3/20 280/124.135
9,346,492 B2 * 5/2016 Oshima .................. B60G 7/001
9,505,283 B2 * 11/2016 Kuwabara .............. B60G 7/001
2003/0006573 A1 1/2003 Seki
2012/0018973 A1 1/2012 Fujii et al.
2022/0192095 A1 * 6/2022 Barkey .................. A01D 34/66

FOREIGN PATENT DOCUMENTS

CN 1847038 A 10/2006
DE 102005052833 A1 * 5/2007 ............ B62D 17/00
JP 20032028 A 1/2003
JP 2008247263 A * 10/2008 ............ B60G 7/008
JP 201225226 A 2/2012

OTHER PUBLICATIONS

Computer generated English translation of DE 10 2005 052833 (Year: 2025).*
Computer generated English translation of JP 2008-247263 (Year: 2025).*

* cited by examiner

*Primary Examiner* — Jason D Shanske
*Assistant Examiner* — Tiffany L Webb
(74) *Attorney, Agent, or Firm* — The Webb Law Firm

(57) ABSTRACT

A work vehicle includes a gap filler in the form of a ring disposed between holders and an end portion of a coupling cylinder and fitted around a shaft. The gap filler fills the gap between the holders and the end portion of the coupling cylinder. The gap filler includes an outer portion as a cover portion fitted around the end portion of the coupling cylinder in such a manner as to cover the end portion of the coupling cylinder along its entire circumference.

4 Claims, 5 Drawing Sheets

WORK VEHICLE

CROSS-REFERENCE TO RELATED APPLICATION

This application claims priority to Japanese Patent Application No. 2023-135495 filed Aug. 23, 2023, the disclosure of which is hereby incorporated by reference in its entirety.

BACKGROUND OF THE INVENTION

Field of the Invention

The present invention relates to a work vehicle.

Description of Related Art

As disclosed in Japanese Unexamined Patent Application Publication, Tokukai, No. 2012-25226 (Patent Literature 1), a work vehicle (that is, a multipurpose work vehicle) may include suspension devices each including an upper arm, a lower arm, and a knuckle arm. The upper and lower arms are each held by a body frame in such a manner as to be swingable up and down. The knuckle arm is coupled to respective free end portions of the upper and lower arms and holds a wheel.

A work vehicle of this type may include for each of the upper and lower arms a pair of holders, a shaft held by the holders, a coupling cylinder disposed between the holders and rotatably fitted around the shaft, and a bushing between the shaft and the coupling cylinder. The upper and lower arms are each so coupled to its corresponding coupling cylinder as to be coupled to the corresponding shaft with use of the coupling cylinder. The upper and lower arms are thereby each held by the corresponding holders in such a manner as to be swingable up and down.

Patent Literature 1

Japanese Unexamined Patent Application Publication, Tokukai, No. 2012-25226

SUMMARY OF THE INVENTION

Conventional work vehicles including a swingable member such as the upper and lower arms described above are provided with grease sealed up and receive grease regularly to reduce wear of the bushing. The work vehicles also have the bushing replaced regularly. Sealing up grease increases costs. The work vehicles require troublesome work of regular maintenance.

The present invention provides a work vehicle that allows a bushing to be used for an extended period of time and that is inexpensive.

A work vehicle according to the present invention includes: a pair of holders; a shaft held by the holders; a coupling cylinder disposed between the holders and rotatably fitted around the shaft; a swingable member coupled to the coupling cylinder in such a manner as to be swingably coupled to the shaft with use of the coupling cylinder; a bushing between the shaft and the coupling cylinder; and a gap filler in a form of a ring fitted around the shaft and positioned in and filling a gap between the holders and an end portion of the coupling cylinder, the gap filler including an outer portion as a cover portion fitted around the end portion in such a manner as to cover the end portion along an entire circumference thereof.

The above configuration involves a gap filler filling the gap between the coupling cylinder and the holders and including a cover portion covering an end portion of the coupling cylinder. The gap filler thus prevents entry of dust into the bushing to prevent the bushing from wearing out easily, thereby allowing the bushing to be used for an extended period of time. Simply using a gap filler prevents the bushing from wearing out easily. This eliminates the need to seal up or regularly add grease, which reduces costs.

The work vehicle may preferably be further configured such that the gap filler is fixed so as not to move together with the coupling cylinder in response to a swing of the swingable member.

If the gap filler were configured to rotate together with the coupling cylinder rotating due to a swing of the swingable member, the rotation of the gap filler would let in dust. With the above configuration, the gap filler is configured to not rotate. This prevents entry of dust and wear of the bushing caused by adhesion of dust.

The work vehicle may preferably be further configured such that the bushing includes an end portion as a flange portion between the gap filler and the end portion of the coupling cylinder.

With the above configuration, the flange portion prevents contact between the gap filler and the end portion of the coupling cylinder. This allows the coupling cylinder to rotate smoothly and the swingable member to swing easily.

The work vehicle may preferably further include: a collar disposed around the shaft and fitted in the bushing.

A swing of the upper swingable member rotates the coupling cylinder, which in turn applies force to the bushing for movement together with the coupling cylinder. The collar, in response, allows the bushing to slide thereon to prevent the bushing from receiving force for twisting the bushing. The collar, in other words, prevents the bushing from being damaged due to twisting force.

The work vehicle may preferably be further configured such that the swingable member is held by a body frame of the work vehicle with the coupling cylinder, the shaft, and the holders in-between, and the work vehicle further includes a wheel support disposed at a free end portion of the swingable member and holding a wheel of the work vehicle in such a manner that the wheel is rotatable.

The above configuration allows each wheel to be attached to the body frame with the swingable member in-between in such a manner as to be capable of being lifted and lowered. This allows the work vehicle to travel easily on rough terrain.

DESCRIPTION OF THE INVENTION

The description below deals with an example embodiment of the present invention with reference to drawings.

Figure 1:
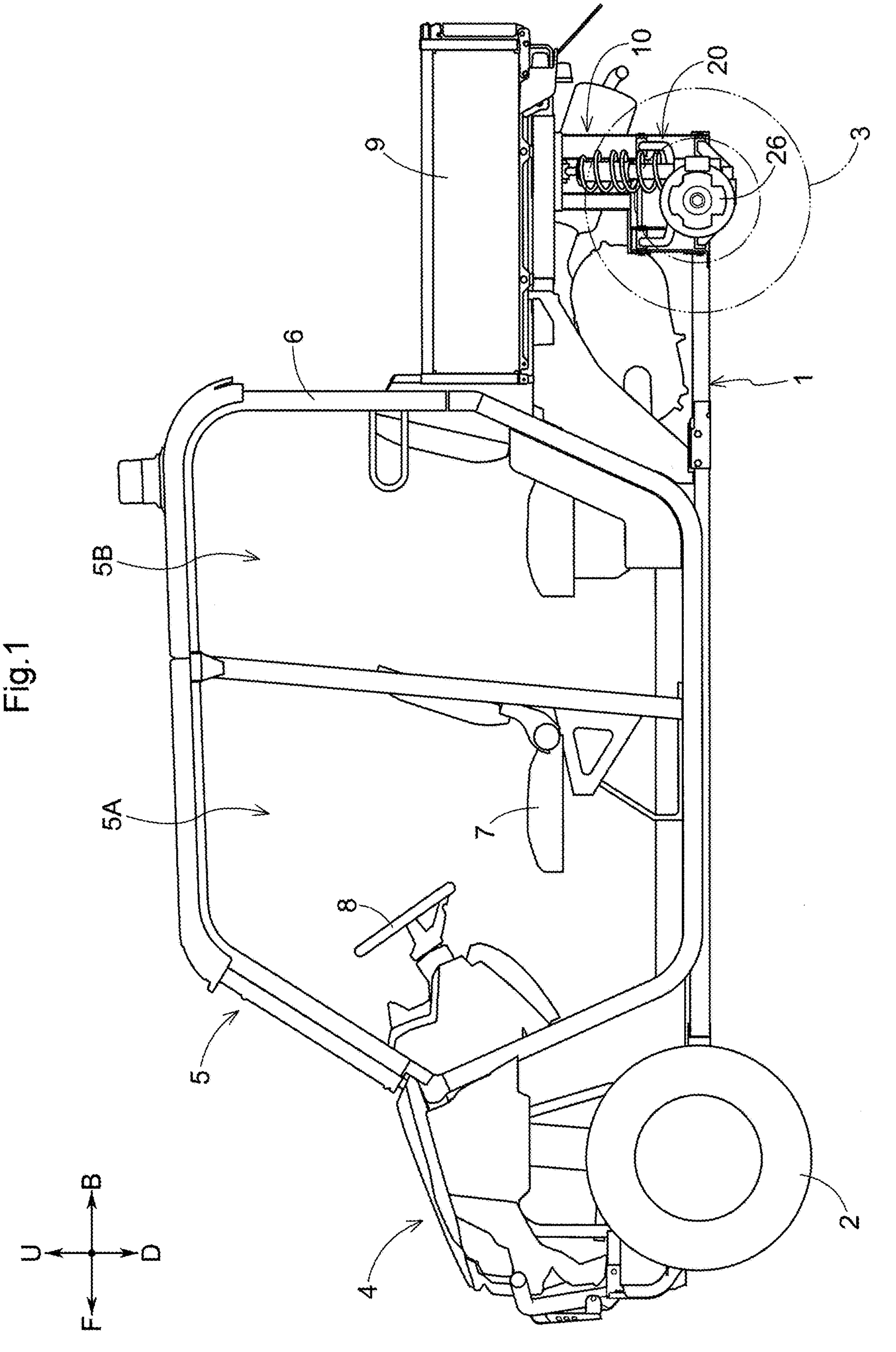
FIG. 1 is a left side view of a utility vehicle.
Figure 2:
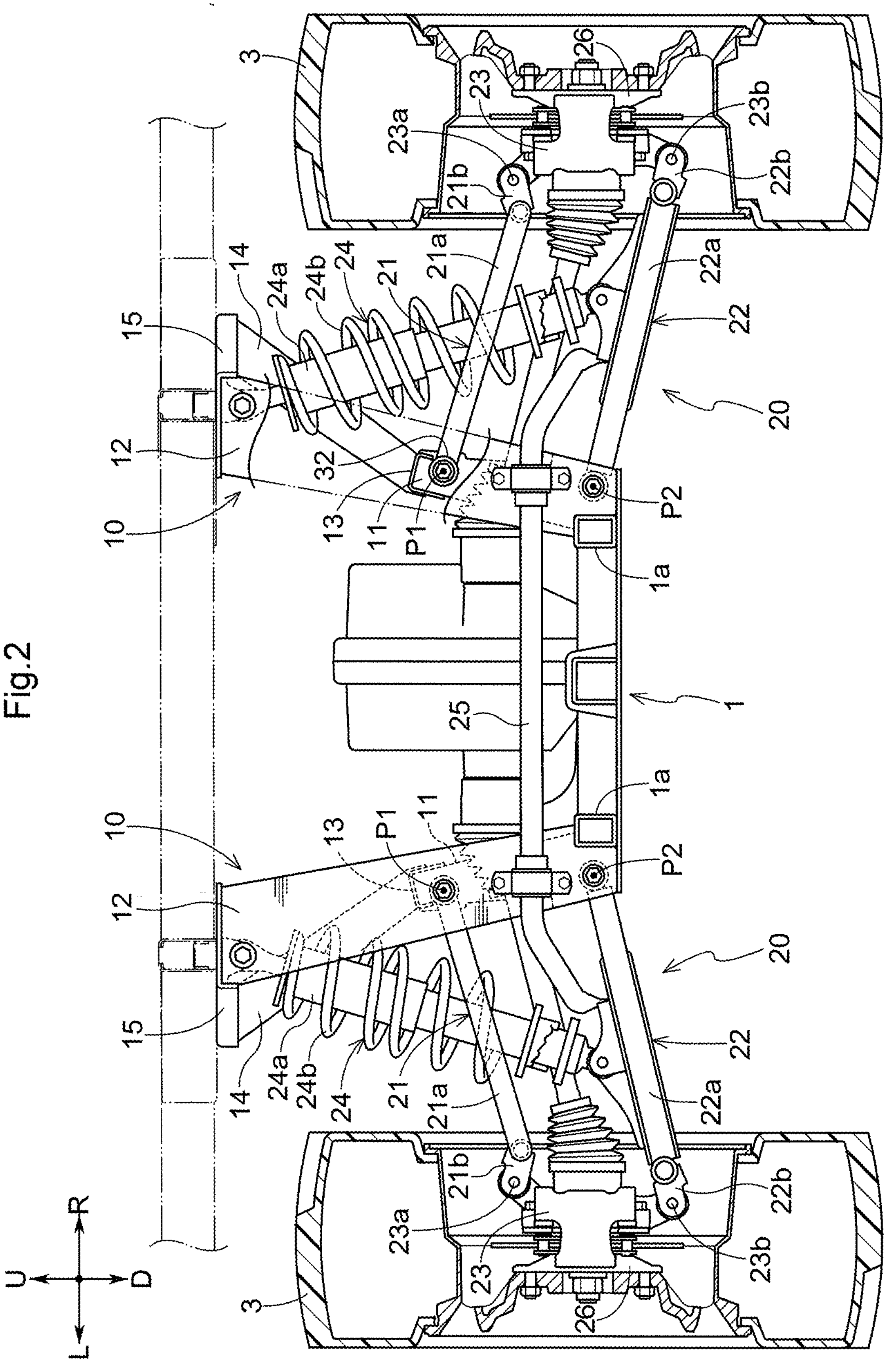
FIG. 2 is a rear view of a structure for holding a pair of left and right rear wheels.
Figure 3:
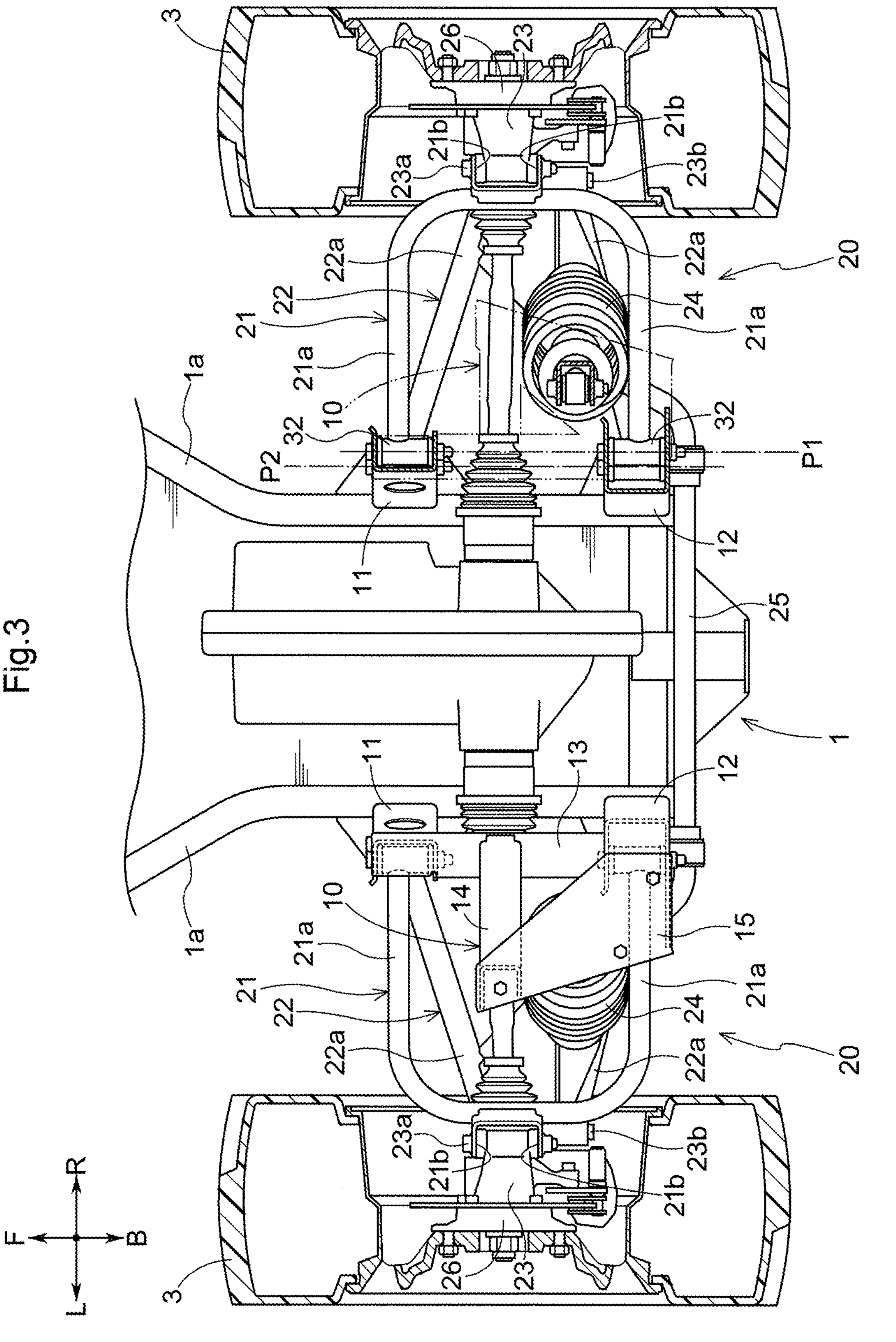
FIG. 3 is a plan view of a structure for holding a pair of left and right rear wheels.

The embodiment described below is a utility vehicle (which is an example of the "work vehicle") including a body. Drawings such as FIGS. 1 and 3 show arrow F to indicate the forward side of the body and arrow B to indicate the backward side of the body. Drawings such as FIGS. 1 and 2 show arrow U to indicate the upward side of the body and arrow D to indicate the downward side of the body. Drawings such as FIGS. 2 and 3 show arrow L to indicate the left side of the body, which corresponds to the front side of FIG. 1. Drawings such as FIGS. 2 and 3 show arrow R to indicate the right side of the body, which corresponds to the back side of FIG. 1. The left-right direction of the body corresponds to the width direction of the body.

Overall Configuration of Utility Vehicle

FIG. 1 illustrates a utility vehicle for multiple purposes such as cargo transport and recreation. The utility vehicle includes a body frame 1, a pair of left and right front wheels 2, a pair of left and right rear wheels 3, and a body 4. The front wheels 2 are held by a front portion of the body frame 1, and are turnable and drivable. The rear wheels 3 are held by a back portion of the body frame 1, and are drivable. The utility vehicle includes a driver section 5 disposed at a portion of the body 4 which portion is between the front wheels 2 and the rear wheels 3. The driver section 5 includes a front driver section 5A, a back driver section 5B, and a roll-over protective structure (ROPS) 6 that defines respective driver spaces of the front and back driver sections 5A and 5B. The front driver section 5A includes a driver's seat 7 and a steering wheel 8 for use to change the direction of the front wheels 2. The utility vehicle includes a cargo box 9 backward of the driver section 5 relative to the body 4.

As illustrated in FIGS. 2 and 3, the body frame 1 includes a pair of left and right rear-wheel holding frame members 10. The utility vehicle includes a pair of left and right suspension devices 20 extending from the respective rear wheels 3 to the respective rear-wheel holding frame members 10. The rear wheels 3 are held by the body frame 1 with the respective suspension devices 20 in-between, and are capable of being lifted and lowered relative to the body 4.

Figure 4:
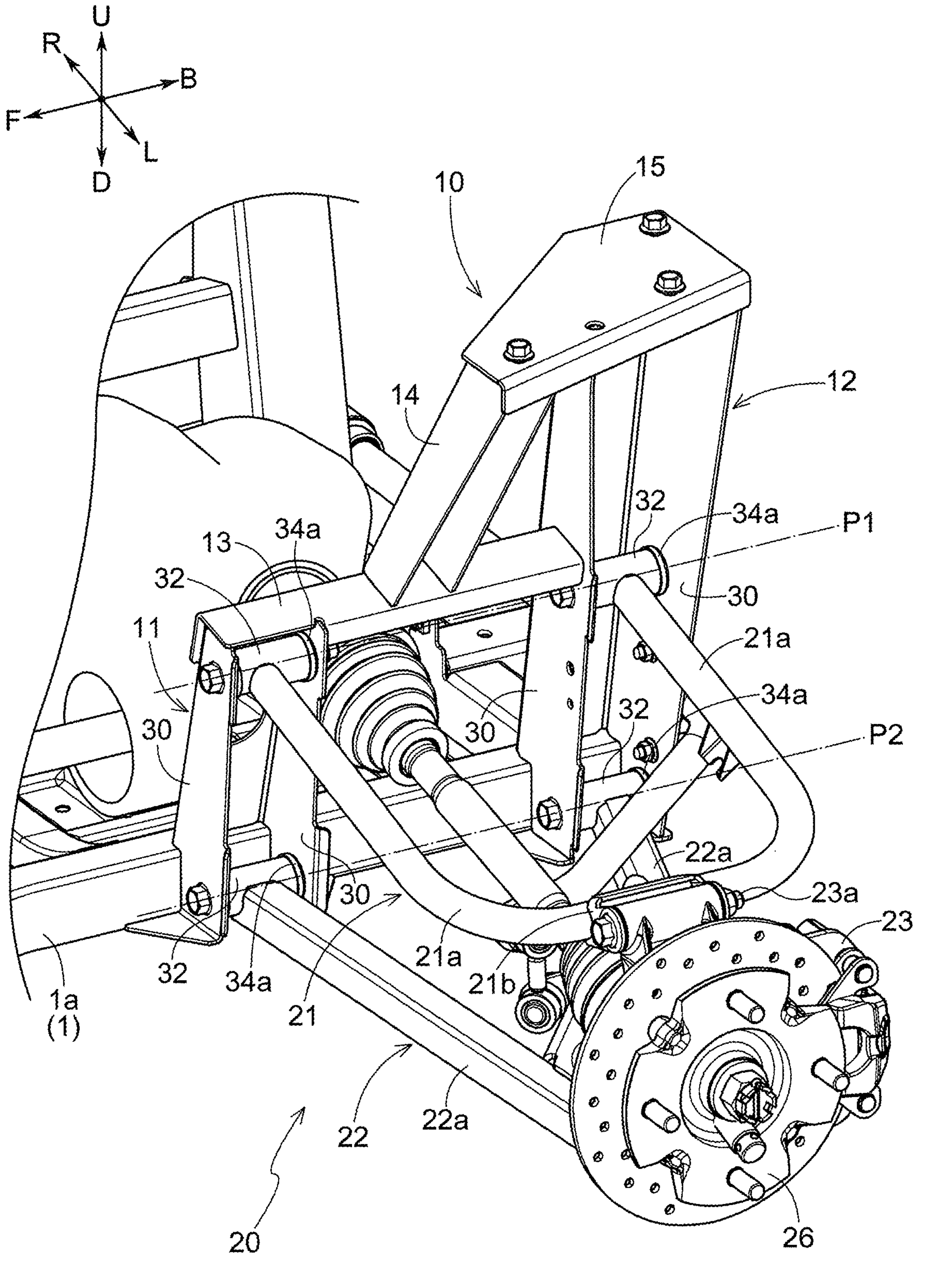
FIG. 4 is a perspective view of a suspension device.

The rear-wheel holding frame members 10 are, as illustrated in FIG. 1, at a back portion of the body frame 1. The rear-wheel holding frame members 10, as illustrated in FIGS. 2, 3, and 4, each include a first frame strut 11, a second frame strut 12, a reinforcing frame portion 13, a third frame strut 14, and a stay 15. The first frame strut 11 stands on a back portion of a main frame member 1*a* included in the body frame 1 and extending in the front-back direction of the body 4. The second frame strut 12 stands on the main frame member 1*a* and backward of the first frame strut 11 relative to the body 4. The reinforcing frame portion 13 couples an upper end portion of the first frame strut 11 to a vertically intermediate portion of the second frame strut 12. The third frame strut 14 stands on an intermediate portion of the reinforcing frame portion 13. The stay 15 is coupled to an upper end portion of the second frame strut 12 and the third frame strut 14.

The suspension devices 20, as illustrated in FIGS. 2, 3, and 4, each include an upper swingable member 21, a lower swingable member 22, a wheel support 23, and a cushion mechanism 24. The upper swingable member 21 is held by the first and second frame struts 11 and 12 and swingable up and down. The lower swingable member 22 is below the upper swingable member 21, and is held by the first and second frame struts 11 and 12 and swingable up and down. The wheel support 23 is coupled to the respective free end portions of the upper and lower swingable members 21 and 22. The cushion mechanism 24 is coupled to the lower swingable member 22 and the stay 15. The cushion mechanism 24 includes a shock absorber 24*a* and a cushion spring 24*b*. The utility vehicle includes a stabilizer 25 coupled to the left and right lower swingable members 22. FIG. 4 omits the cushion mechanism 24.

As illustrated in FIGS. 2 and 3, the upper swingable member 21 is provided at its free end portion with a pair of holders 21*b*. The wheel support 23 is provided with a coupler shaft 23*a* extending in the front-back direction of the body 4. The wheel support 23 includes an upper portion coupled to the holders 21*b* and is swingable about the coupler shaft 23*a*. The lower swingable member 22 is provided at its free end portion with a pair of holders 22*b*. The wheel support 23 is provided with a coupler shaft 23*b* extending in the front-back direction of the body 4. The wheel support 23 includes a lower portion coupled to the holders 22*b* and is swingable about the coupler shaft 23*b*. The wheel support 23 includes a flange 26 to and from which the corresponding rear wheel 3 is attachable and detachable and which is drivable to rotate.

The wheel support 23 is coupled to the corresponding rear-wheel holding frame member 10 with components such as the upper and lower swingable members 21 and 22 in-between in such a manner as to be capable of being lifted and lowered. Attaching the corresponding rear wheel 3 to the flange 26 allows the rear wheel 3 to be held by the corresponding rear-wheel holding frame member 10 in such a manner as to be capable of being lifted and lowered.

The upper swingable member 21, as illustrated in FIGS. 2, 3, and 4, includes a pair of front and back arms 21*a* apart from each other in the front-back direction of the body 4 and including respective free end portions coupled to each other. The upper swingable member 21 for the present embodiment is in the form of a steel pipe bent in a U shape in a plan view. The front arms 21*a* is coupled to the first frame strut 11 in such a manner as to be swingable up and down, whereas the back arm 21*a* is coupled to the second frame strut 12 in such a manner as to be swingable up and down. This allows the upper swingable member 21 to be held by the first and second frame struts 11 and 12 in such a manner as to be swingable up and down.

The lower swingable member 22, as illustrated in FIGS. 2, 3, and 4, includes a pair of front and back arms 22*a* apart from each other in the front-back direction of the body 4 and including respective free end portions coupled to each other. The lower swingable member 22 for the present embodiment is in the form of two or more steel pipes coupled to each other in a V shape in a plan view. The front arms 22*a* is coupled to the first frame strut 11 in such a manner as to be swingable up and down, whereas the back arm 22*a* is coupled to the second frame strut 12 in such a manner as to be swingable up and down. This allows the lower swingable member 22 to be held by the first and second frame struts 11 and 12 in such a manner as to be swingable up and down.

Figure 5:
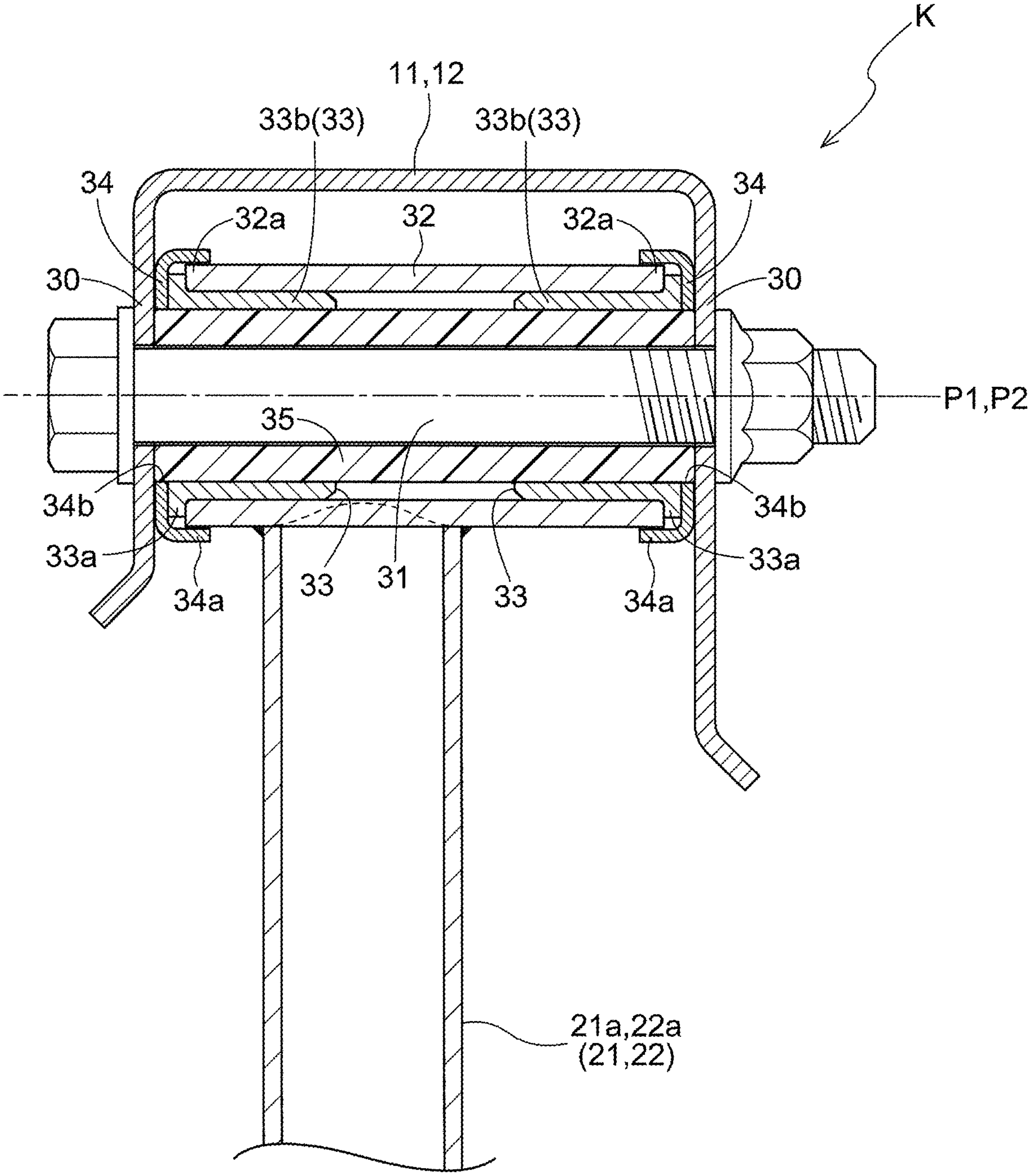
FIG. 5 is a cross-sectional view of a structure for holding an upper swingable member and a lower swingable member.

The front arm 21*a* is coupled to the first frame strut 11 with use of a coupling structure K illustrated in FIG. 5.

Specifically, the coupling structure K, as illustrated in FIG. 5, includes a pair of holders 30 provided for the first frame strut 11, a shaft 31 held by the holders 30, a coupling cylinder 32 disposed between the holders 30 and fitted around the shaft 31, a bushing unit 33 between the coupling cylinder 32 and the shaft 31, and a pair of gap fillers 34 at the opposite ends of the coupling cylinder 32.

The holders 30 are next to each other with a predetermined distance in-between along the swing axis P1 of the upper swingable member 21. The shaft 31 has an axis coinciding with the swing axis P1.

The coupling cylinder 32 is rotatably fitted around the shaft 31 and coupled to the arm 21*a* such that the arm 21*a* is swingably coupled to the shaft 31.

The coupling structure K includes a collar 35 disposed around the shaft 31 and fitted in the bushing unit 33. A swing of the upper swingable member 21 rotates the coupling cylinder 32, which in turn applies force to the bushing unit 33 for rotation together with the coupling cylinder 32. The collar 35, in response, allows the bushing unit 33 to slide thereon to prevent the bushing unit 33 from receiving force for twisting the bushing unit 33.

The gap fillers 34 are each a ring fitted around the collar 35 and positioned in and filling a gap between an end portion 32*a* of the coupling cylinder 32 and the corresponding holder 30. Each gap filler 34 includes an outer portion as a cover portion 34*a* fitted around the corresponding end portion 32*a*. The cover portion 34*a* is in the form of a ring that covers the end portion 32*a* along its entire circumference. The gap filler 34 prevents entry of dust toward the bushing unit 33 through a space between the end portion 32*a* and the cover portion 34*a* and a space between the holder 30 and the end portion 32*a*.

The bushing unit 33 includes opposite end portions each as a flange portion 33*a* between the corresponding gap filler 34 and the corresponding end portion 32*a*. The flange portion 33*a* prevents contact between the gap filler 34 and the end portion 32*a* and ensures smooth rotation of the coupling cylinder 32.

The bushing unit 33, as illustrated in FIG. 5, includes two divisional bushings 33*b* disposed at the respective opposite ends of the coupling cylinder 32 and each assemblable by inserting that end of the divisional bushing 33*b* at which the flange portion 33*a* is absent into a space between the coupling cylinder 32 and the collar 35.

When a swing of the upper swingable member 21 rotates the coupling cylinder 32, a rotation of the gap fillers 34 together with the coupling cylinder 32 would let dust into a space between the gap fillers 34 and the holders 30. To prevent this, the gap fillers 34 are fixed to the collar 35 so as not to move together with the coupling cylinder 32. Specifically, the collar 35 is fastened to the holders 30 by the fastening force of the shaft 31 as a screw shaft so as not to rotate relative to the holders 30. The gap fillers 34 each have an attachment hole 34*b* for the gap filler 34 to be fitted around the collar 35 for attachment. The gap fillers 34 are each fixed to the collar 35 through adjustment of the fit tolerance between the attachment hole 34*b* and the outer diameter of the collar 35. The collar 35 is fixable to the holders 30 so as not to rotate with use of not only the shaft 31 to fasten the collar 35 to the holders 30 but also the fit tolerance between the axial dimension of the collar 35 and the distance between the holders 30.

The back arm 21*a* is coupled to the second frame strut 12 with use of a coupling structure identical to the coupling structure K, except that the holders 30 are provided for the second frame strut 12 and are next to each other with a predetermined distance along the swing axis P1 of the upper swingable member 21. The shaft 31 has an axis coinciding with the swing axis P1.

The front arm 22*a* is coupled to the first frame strut 11 with use of a coupling structure identical to the coupling structure K, except that the holders 30 are next to each other with a predetermined distance along the swing axis P2 of the lower swingable member 22. The shaft 31 has an axis coinciding with the swing axis P2.

The back arm 22*a* is coupled to the second frame strut 12 with use of a coupling structure identical to the coupling structure K, except that the holders 30 are provided for the second frame strut 12 and are next to each other with a predetermined distance along the swing axis P2 of the lower swingable member 22. The shaft 31 has an axis coinciding with the swing axis P2.

Alternative Embodiments (1) The embodiment described above is an example of the present invention being applied to the structure in which the upper and lower swingable members 21 and 22 for the rear wheels are held by the body frame 1. The present invention is, however, not limited to such a configuration, and may alternatively be applied to, for instance, a structure in which upper and lower swingable members of suspension devices for the front wheels 2 are held by the body frame 1, a structure in which the wheel support 23 is swingably supported by the upper and lower swingable members 21 and 22, or a structure in which the cushion mechanism 24 is swingably supported by the lower swingable member 22, the upper swingable member 21, or the body frame 1.

(2) The embodiment described above is an example in which the gap fillers 34 do not move together with the coupling cylinder 32. The gap fillers 34 may alternatively be configured to move together with the coupling cylinder 32.

(3) The embodiment described above is an example in which the bushing unit 33 includes flange portions 33*a*. The bushing unit 33 may alternatively omit the flange portions 33*a*.

(4) The embodiment described above is an example including a collar 35. The present invention may alternatively omit the collar 35.

INDUSTRIAL APPLICABILITY

The present invention is applicable to not only utility vehicles but also any other work vehicle such as transport vehicles.

REFERENCE SIGNS LIST

1 Body frame
21 Upper swingable member (swingable member)
22 Lower swingable member (swingable member)
23 Wheel support
30 Holder
31 Shaft
32 Coupling cylinder
32*a* End portion
33 Bushing
33*a* Flange portion
34 Gap filler
34*a* Cover portion
35 Collar

The invention claimed is:

1. A work vehicle, comprising:

a pair of holders;

an upper shaft and a lower shaft held by the holders;

a pair of coupling cylinders disposed between the holders, each rotatably fitted around a respective one of the upper shaft and the lower shaft;

an upper swingable member and a lower swingable member coupled to the coupling cylinders in such a manner as to be swingably coupled to the respective one of the upper shaft and the lower shaft with use of the coupling cylinders;

a pair of bushings, each disposed between a respective one of the upper shaft and the lower shaft and the corresponding coupling cylinder; and a pair of gap fillers, each in a form of a ring fitted around a respective one of the upper shaft and the lower shaft and positioned in and filling a gap between the holders and an end portion of the corresponding coupling cylinder, and wherein each gap filler comprises an outer portion as a cover portion fitted around the end portion in such a manner as to cover the end portion along an entire circumference thereof, the work vehicle further comprises a pair of collars, each disposed around a respective one of the upper shaft and the lower shaft and fitted in the corresponding bushing, the gap fillers are each fitted around the collars, the collars are fixed to the holders so as not to rotate relative to the holders, and the gap fillers are fixed to the collars.

2. The work vehicle according to claim 1, wherein:

each gap filler is fixed so as not to move together with the corresponding coupling cylinder in response to a swing of the upper swingable member or the lower swingable member.

3. The work vehicle according to claim 1, wherein:

each bushing comprises an end portion as a flange portion between the corresponding gap filler and the end portion of the corresponding coupling cylinder.

4. The work vehicle according to claim 1, wherein:

the upper swingable member is held by a body frame of the work vehicle with one of the pair of coupling cylinders, the upper shaft, and the holders in-between, the lower swingable member is held by the body frame of the work vehicle with one of the pair of coupling cylinders, the lower shaft, and the holders in-between, and the work vehicle further comprises wheel supports disposed at free end portions of the upper swingable member and the lower swingable member, each wheel support holding a wheel of the work vehicle in such a manner that the wheel is rotatable.

* * * * *